(12) United States Patent
Shastri et al.

(10) Patent No.: US 8,876,410 B2
(45) Date of Patent: Nov. 4, 2014

(54) SELF-ALIGNING CONNECTORIZED FIBER ARRAY ASSEMBLY

(71) Applicant: Cisco Technology, Inc., San Jose, CA (US)

(72) Inventors: Kalpendu Shastri, Orefield, PA (US); Soham Pathak, Allentown, PA (US); Utpal Chakrabarti, Allentown, PA (US); Vipulkumar Patel, Breinigsville, PA (US); Bipin Dama, Bridgewater, NJ (US); Ravinder Kachru, Los Altos Hills, CA (US); Kishor Desai, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 102 days.

(21) Appl. No.: 13/737,080

(22) Filed: Jan. 9, 2013

(65) Prior Publication Data

US 2013/0183008 A1    Jul. 18, 2013

Related U.S. Application Data

(60) Provisional application No. 61/585,371, filed on Jan. 11, 2012.

(51) Int. Cl.
*G02B 6/00* (2006.01)
*G02B 6/36* (2006.01)
*G02B 6/42* (2006.01)

(52) U.S. Cl.
CPC .................................. *G02B 6/4292* (2013.01)
USPC ............................................. 385/89; 385/147

(58) Field of Classification Search
USPC .................................. 385/12–16, 88–92, 147
See application file for complete search history.

(56) References Cited

U.S. PATENT DOCUMENTS

| | | | | |
|---|---|---|---|---|
| 4,673,245 | A * | 6/1987 | Kling et al. | 385/80 |
| 5,129,022 | A | 7/1992 | Marcus | |
| 5,519,799 | A | 5/1996 | Murakami et al. | |
| 6,186,670 | B1 | 2/2001 | Austin et al. | |
| 6,241,399 | B1 | 6/2001 | Nobuhara | |
| 6,577,783 | B2 * | 6/2003 | Dautartas et al. | 385/17 |
| 6,827,503 | B2 | 12/2004 | Steinberg et al. | |
| 6,910,812 | B2 | 6/2005 | Pommer et al. | |
| 7,204,646 | B2 | 4/2007 | Sasaki et al. | |
| 7,352,935 | B2 * | 4/2008 | Furuyama et al. | 385/52 |
| 7,476,037 | B2 | 1/2009 | Golwalkar et al. | |
| RE41,742 | E * | 9/2010 | Furuyama et al. | 385/52 |
| 2003/0201462 | A1 * | 10/2003 | Pommer et al. | 257/200 |
| 2004/0101020 | A1 | 5/2004 | Bhandarkar | |

(Continued)

*Primary Examiner* — Akm Enayet Ullah
(74) *Attorney, Agent, or Firm* — Patterson & Sheridan, LLP

(57) ABSTRACT

An apparatus for providing self-aligned optical coupling between an opto-electronic substrate and a fiber array, where the substrate is enclosed by a transparent lid such that the associated optical signals enter and exit the arrangement through the transparent lid. The apparatus takes the form of a two-part connectorized fiber array assembly where the two pieces uniquely mate to form a self-aligned configuration. A first part, in the form of a plate, is attached to the transparent lid in the area where the optical signals pass through. The first plate includes a central opening with inwardly-tapering sidewalls surrounding its periphery. A second plate is also formed to include a central opening and has a lower protrusion with inwardly-tapering sidewalls that mate with the inwardly-tapering sidewalls of the first plate to form the self-aligned connectorized fiber array assembly. The fiber array is then attached to the second plate in a self-aligned fashion.

20 Claims, 6 Drawing Sheets

(56) References Cited

U.S. PATENT DOCUMENTS

| | | |
|---|---|---|
| 2012/0141073 A1 | 6/2012 | Mainardi et al. |
| 2013/0182996 A1* | 7/2013 | Shastri et al. .................. 385/14 |
| 2013/0183010 A1* | 7/2013 | Fangman et al. ............... 385/93 |
| 2014/0003457 A1* | 1/2014 | Shastri et al. .................. 372/36 |
| 2014/0042463 A1* | 2/2014 | Uemura et al. ................. 257/80 |
| 2014/0044389 A1* | 2/2014 | Uemura et al. ................. 385/14 |
| 2014/0099059 A1* | 4/2014 | Pommer et al. ................ 385/33 |

\* cited by examiner

SELF-ALIGNING CONNECTORIZED FIBER ARRAY ASSEMBLY

CROSS-REFERENCE TO RELATED APPLICATIONS

This application claims the benefit of U.S. Provisional Application No. 61/585,371 filed Jan. 11, 2012.

TECHNICAL FIELD

The present disclosure relates to a connectorized fiber array for use with an opto-electronic assembly and, more particularly, to a two-part self-aligning connectorized fiber array assembly formed of precision components.

BACKGROUND

Many types of opto-electronic modules comprise a number of separate optical and electrical components that require precise placement relative to one another. A silicon (or glass) carrier substrate (sometimes referred to as an interposer) is generally used as a support structure to fix the location of the components and may, at times, also provide the desired electrical or optical signal paths between selected components. As the components are being assembled on the interposer, active optical alignment may be required to ensure that the integrity of the optical signal path is maintained. In most cases, a "lid" is placed over and attached to the populated interposer substrate to enclose the assembly.

The optical input/output paths to the assembly are generally maintained along a common plane, with a fiber array containing several individual fibers typically used as the optical signal path between the interposer and the external communication environment. Most configurations utilize a fiber array and connector assembly that need to be aligned with an associated opto-electronic module on an individual basis. An active alignment process is generally used to attach the fiber array to the module's enclosed interposer, with the two components moved relative to one another until an optimum amount of coupled optical power is recognized.

There are situations, however, where it would be preferable to utilize a passive coupling arrangement that automatically aligns the fiber array with the interposer upon attachment (i.e., self-aligned) and, perhaps, is also able to be removed and re-inserted while maintaining the integrity of the alignment.

BRIEF DESCRIPTION OF THE DRAWINGS

The accompanying drawings, which are incorporated in and constitute a part of this disclosure, illustrate various embodiments of the present invention. In the drawings.

DESCRIPTION OF EXAMPLE EMBODIMENTS

Overview

Figure 1:
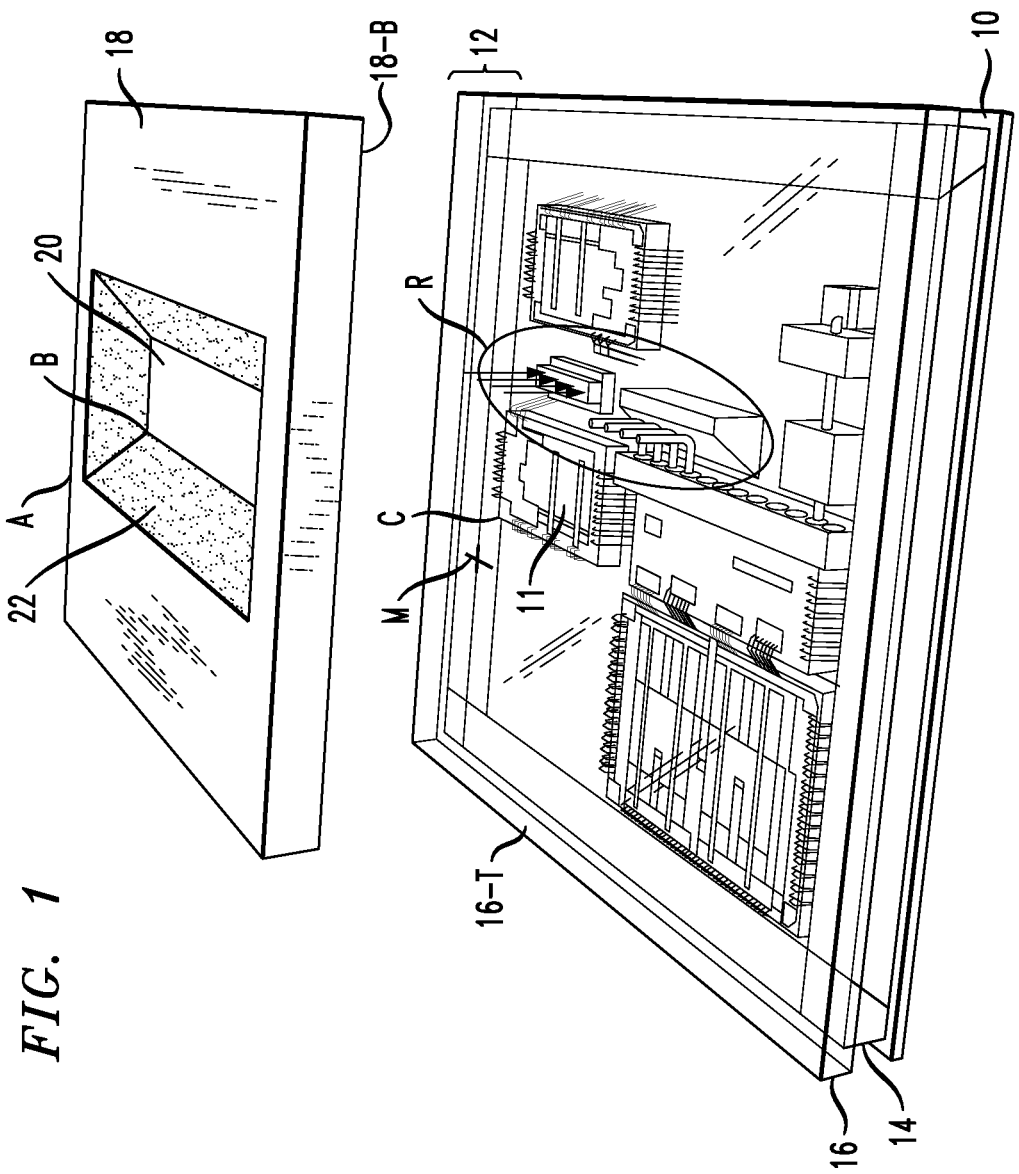
FIG. 1 is an isometric view of an opto-electronic module assembly of a particular embodiment of the present invention, illustrating an interposer substrate for supporting opto-electronic devices and a first portion of a self-aligned connector assembly for coupling a fiber array to the interposer.

An apparatus for providing self-aligned optical coupling between an interposer substrate (supporting a plurality of opto-electronic components) and a fiber array, the interposer substrate being enclosed by a transparent lid such that the associated optical signals enter and exit the interposer through the transparent lid. The apparatus takes the form of a two-part connectorized fiber array assembly where the two pieces mate to form a self-aligned configuration. A first connector assembly plate is attached to the transparent lid in the area where the optical signals pass through. The first connector assembly plate includes a central opening with inwardly-tapering sidewalls surrounding its periphery. A second connector assembly plate is also formed to include a central opening and has a lower protrusion with inwardly-tapering sidewalls that mate with the inwardly-tapering sidewalls of the first connector assembly plate to form the self-aligned connectorized fiber array assembly. The fiber array is then attached to the second connector assembly plate.

Example Embodiments

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

FIG. 1 is an isometric view of an opto-electronic module assembly of a particular embodiment of the present invention, illustrating an interposer substrate for supporting opto-electronic devices and a first portion of a self-aligned connector assembly for coupling a fiber array (not shown) to the interposer. Referring to FIG. 1, the arrangement utilizes an interposer substrate 10 that may comprise any suitable material, where silicon and glass materials are conventional choices for this purpose. Interposer substrate 10 is processed to include the various optical and electrical components necessary to form a particular opto-electronic assembly (e.g., transmitter, receiver, modulator, or the like). The completed opto-electronic assembly as formed on interposer 10 is then capable of generating optical output signals and receiving optical input signals.

Figure 2:
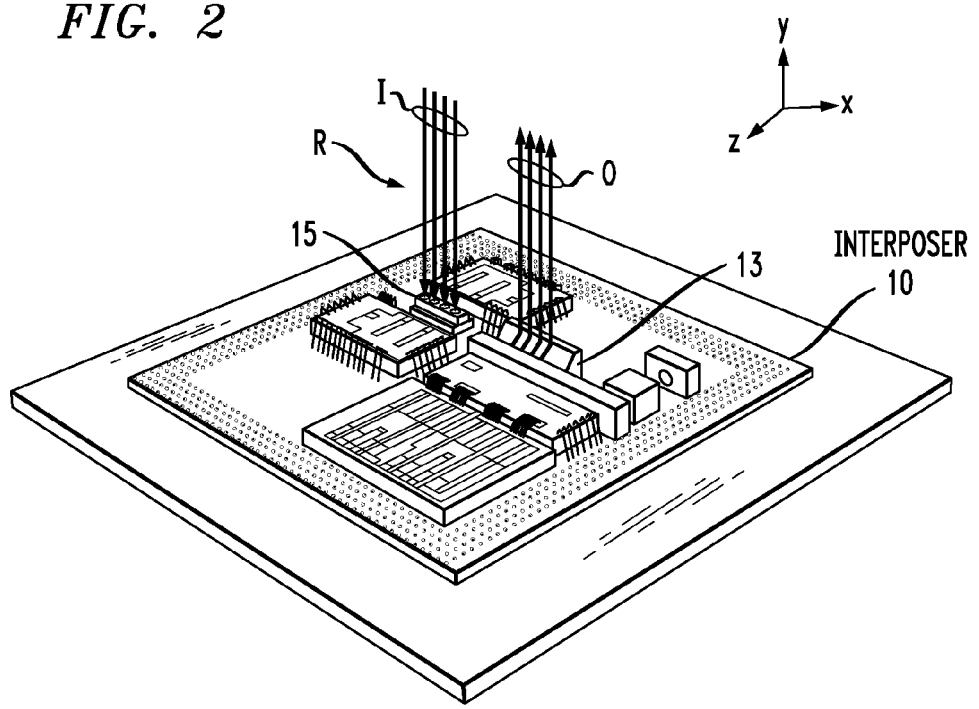
FIG. 2 shows in more detailed form the direction of the optical signal paths associated with the interposer of FIG. 1.

FIG. 2 shows in more detailed form the direction of the optical signal paths associated with the interposer of FIG. 1.

It is to be understood that the specific optical communication properties of the elements forming the interposer assembly are not relevant to this discussion, beyond the understanding that the arrangement creates one or more optical output signals O, which are shown in FIG. 2 as being redirected from the z-axis direction of interposer 10 "upward" along the y-axis, in this case by using a turning mirror component 13 disposed on interposer 10. A plurality of input optical signals I is also shown in FIG. 2, in this case shown as being received by a plurality of photodiode elements 15 disposed on interposer 10. As the various components are being assembled, therefore, a self-aligned connectorized fiber array assembly of the present invention is used to provide alignment between an optical fiber array (not shown) and these input and output optical signals.

Referring back to FIG. 1, the illustrated embodiment of an opto-electronic module assembly is shown as also comprising an enclosure (housing) 12 which is configured to include a sidewall 14 and a transparent lid 16. Sidewall 14 is formed to completely surround the opto-electronic components disposed on interposer 10, with transparent lid disposed over and attached to sidewall 14. With this configuration, the optical input and output signals associated with the devices included on interposer 10 pass through transparent lid 16 in the manner particularly illustrated in FIG. 2. In one embodiment, a glass lid can be used.

In accordance with an embodiment of the present invention, the coupling of these optical signals with an associated fiber array is provided by a two-piece, self-aligned connector assembly, where a first connector assembly plate 18 is shown in FIG. 1. In use, first connector assembly plate 18 attaches to a top surface 16-T of transparent lid 16 (using a suitable epoxy or other bonding adhesive). First connector assembly plate 18, as described in detail below, contains a central opening 20 that is disposed over a defined optical port region R where the optical signals enter/exit the opto-electronic module assembly through transparent lid 16 (optical port region R is also shown in FIG. 2). Therefore, as long as first connector assembly plate 18 is properly aligned with optical port region R, optical signals will pass through central opening 20 unimpeded. First connector assembly plate 18 is also shown in FIG. 1 as comprising a plurality of inwardly-tapering sidewalls 22 that are formed to surround the periphery of central opening 20. As discussed in detail below, inwardly-tapering sidewalls 22 are used to engage a second connector assembly plate in a self-aligned configuration.

Continuing with the description of the arrangement shown in FIG. 1, first connector assembly plate 18 may be attached to transparent lid 16 using an alignment process which ensures that opening 20 is properly positioned with respect to optical port region R associated with the optical signal paths. In one example embodiment, a visual alignment system is used to fix the positioning of first connector assembly plate 18 with respect to transparent lid 16. In one case, a fiducial marking M is made on top surface 16-T of transparent lid 16, where the positioning of first connector assembly plate 18 is adjusted until a known marking location (such as, for example, corner A) of plate 18 aligns with fiducial marking M. In another example case of a visual alignment process, a known registration marker of plate 18 (for example, corner B) is adjusted in position with respect to an opto-electronic component location on interposer 10, such as a specific corner C of a receiver integrated circuit 11. These are only various examples; many different types of visual alignment arrangements may be used. Furthermore, it is possible to use a mechanical alignment arrangement, with interlocking alignment fiducials formed on top surface 16-T of transparent lid 16 and bottom surface 18-B of first connector assembly plate 18. All of these various alignment techniques are well-known to those skilled in the art.

Figure 3:
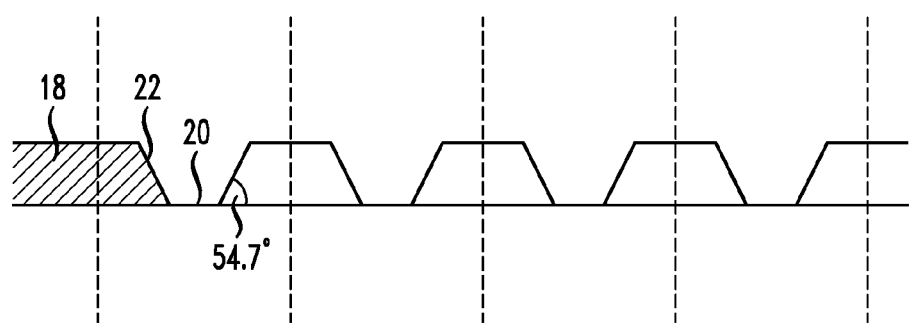
FIG. 3 is a cut-away side view of an exemplary silicon-based connector assembly plate illustrating the inwardly-tapering sidewall.

In one embodiment of the present invention, first connector assembly plate 18 is formed of a silicon material, so that sidewalls 22 of plate 18 may be formed using a conventional photolithographic etching process to exhibit a predetermined inwardly-tapering angle. FIG. 3 is a cut-away side view of an exemplary silicon-based connector assembly plate illustrating the inwardly-tapering sidewall. The use of silicon as the material for first connector plate assembly 18 allows for a wafer scale process to be employed to simultaneously fabricate a large number of assembly plates, each having the precise dimensions required for this purpose. However, it is to be understood that other materials (e.g., metals or plastics) may be used and processed using precision fabrication processes (milling, molding, etc. to form the connector assembly plates.

As shown in FIG. 3, sidewall 22 is formed to comprise an angle of about 54.7°, which is formed by etching through the silicon material with a chemical agent that is known to preferentially etch silicon along a specific crystallographic plane (KOH is one known etchant that is useful for this purpose). Therefore, by properly patterning a silicon wafer, a large number of these first connector assembly plates 18 can be formed simultaneously, each having sidewalls 22 of the desired angle and forming central openings 20 in the precise locations that will allow for unimpeded passage of the optical communication signals. As mentioned above, however, it is to be understood that the two-piece self-aligned connectorized fiber array assembly can in general be formed of other materials and processed using precision techniques to provide the desired self-aligned quality.

Figure 4:
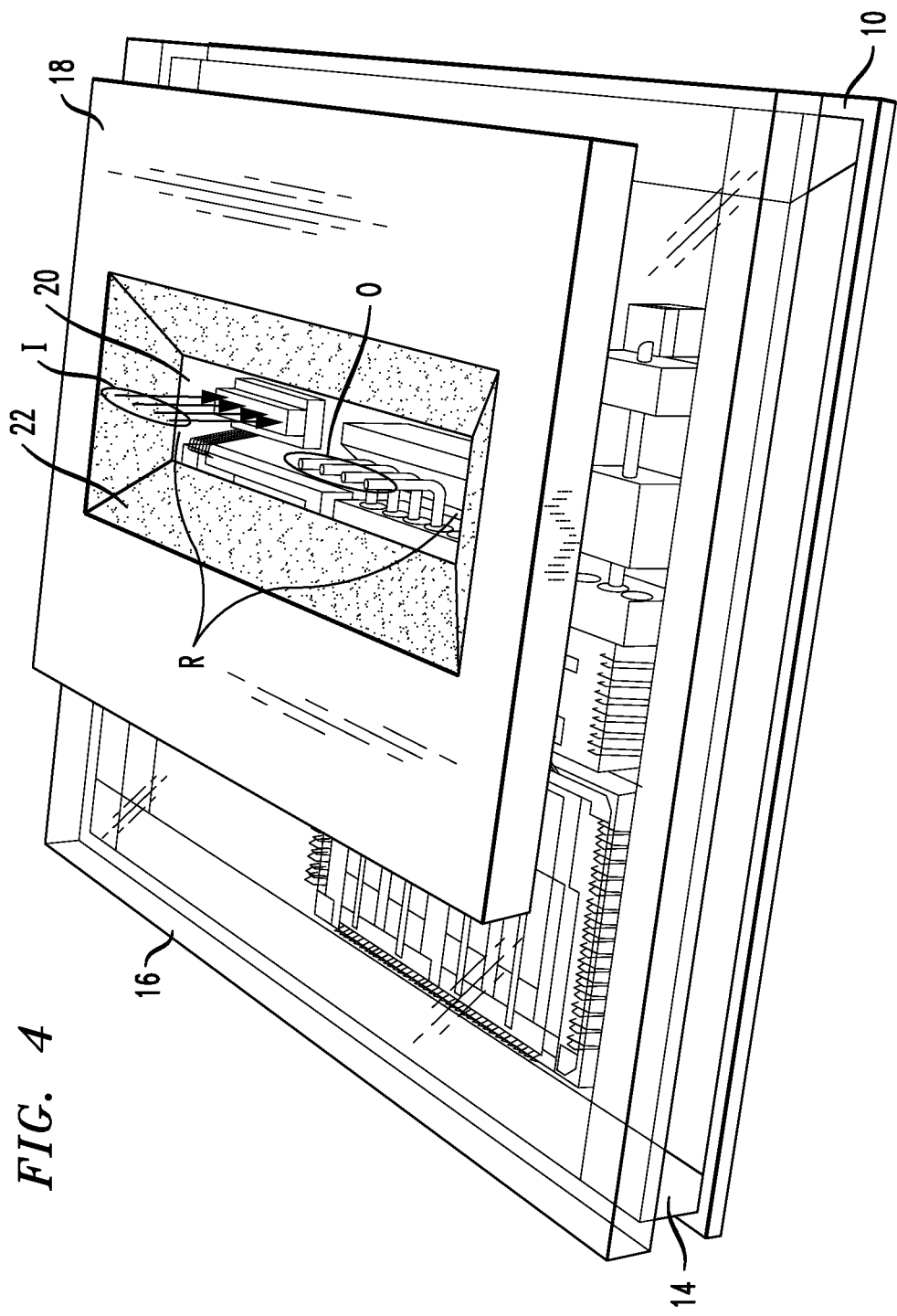
FIG. 4 illustrates a placement of a first connector assembly plate over an opto-electronic assembly in an aligned configuration such that the optical signals pass freely through both the transparent lid of the assembly and the opening in the connector assembly plate.

FIG. 4 illustrates a placement of a first connector assembly plate over an opto-electronic assembly in an aligned configuration such that the optical signals pass freely through both the transparent lid of the assembly and the opening in the connector assembly plate. In particular, FIG. 4 shows first connector assembly plate 18 in place over and attached to transparent lid 16 covering interposer 10 (where interposer 10 is populated with various opto-electronic devices). First connector assembly plate 18 is aligned in the manner described above such that the input and output optical signals (I,O) pass through both optical port region R of transparent lid 16 and opening 20 of plate 18. Tapered sidewalls 22 of first connector assembly plate 18 are also evident in this view.

Figure 5:
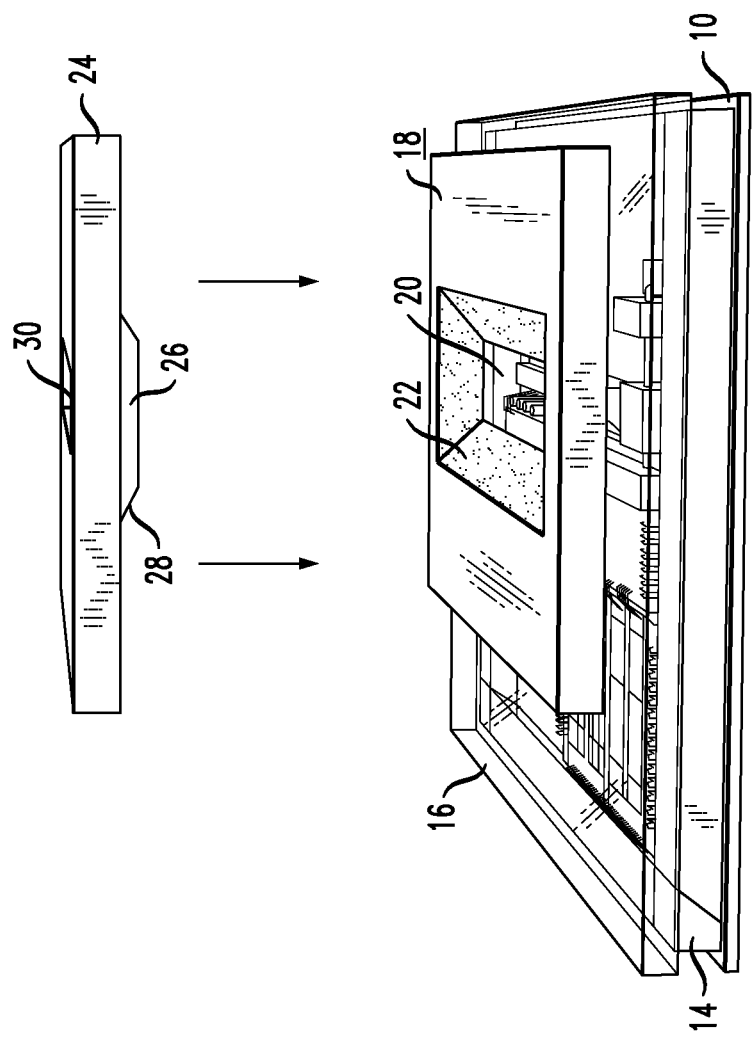
FIG. 5 illustrates a second connector assembly plate positioned above the combination of the opto-electronic assembly and the first connector assembly plate as previously discussed hereinabove in association with FIG. 4.

In accordance with one embodiment of the present invention, a self-aligned connectorized fiber array assembly is created by utilizing a second connector assembly plate that physically mates with the first connector assembly plate in a manner that will allow for an associated fiber array to be aligned with the optical signals passing into and out of the interposer. FIG. 5 illustrates a second connector assembly plate positioned above the combination of the opto-electronic assembly and the first connector assembly plate as previously discussed hereinabove in association with FIG. 4.

Referring to FIG. 5, a second connector assembly plate 24 is shown as being disposed over and thereafter attached to first connector assembly plate 18. The attachment is "self-aligned" in that second connector assembly plate 24 will only engage first connector assembly plate 18 in one, unique configuration. Second connector assembly plate 24 provides this self-aligning property by an included lower, tapered protrusion 26 that is configured to fit precisely within opening 20 of first connector assembly plate 18. As shown, protrusion 26 includes a plurality of inwardly-tapering sidewalls 28 that are formed to mate with inwardly-tapering sidewalls 22 of first connector assembly plate 18.

In one embodiment of the present invention, second connector assembly plate 24 is formed of silicon such that protrusion 26 may be created by using a photolithographic process on the silicon material (with a large number of assembly plates simultaneously fabricated using a wafer scale process). Again, the specific fabrication process may use a preferential etchant that forms sidewalls 28 of protrusion 26 to exhibit a known angle (e.g., 54.7°). A central opening 30 is formed in second connector assembly plate 24 and is located to as to align with opening 20 of first connector assembly plate 18. By virtue of using silicon in one embodiment to form the two-piece connectorized fiber array assembly, known photolithographic techniques can be used to form precision openings, tapers, and the like, allowing for second connector assembly plate 24 to accurately (and repeatably) mate with first plate 18 in a self-aligned configuration. However, other materials may be used to form the first and second connector assembly plates.

Figure 6:
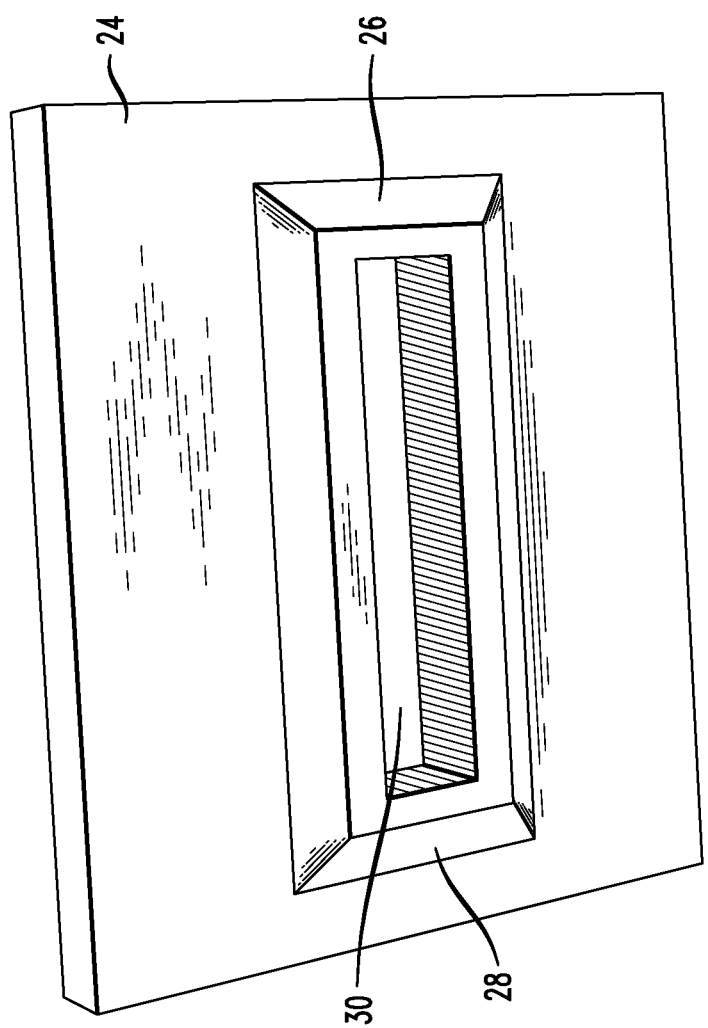
FIG. 6 is an isometric view of the underside of one embodiment of a second connector assembly plate that may be used in the two-piece, self-aligned connectorized fiber array assembly of the present invention.

FIG. 6 is an isometric view of the underside of one embodiment of a second connector assembly plate that may be used in the two-piece, self-aligned connectorized fiber array assembly of the present invention. Opening 30 of second connector assembly plate 24 is evident in this view, as well as tapered sidewalls 28 of protrusion 26. In one embodiment, second connector assembly plate 24 may be permanently attached to first connector assembly plate 18, using a suitable epoxy or other adhesive material. In another embodiment, second connector assembly plate 24 may be inserted within first connector assembly plate 18 in a manner where it may be removed and replaced as desired. In this instance, some type of clamping arrangement (not shown) may be used to maintain second connector assembly plate 24 in place until it is desired to be removed.

In any case, second connector assembly plate 24 will self-align with first connector assembly plate 18 upon mating, with protrusion 26 naturally engaging with opening 20 of first plate 18, and tapered sidewalls 28 of protrusion 26 engaging with tapered sidewalls 22 of first plate 18. An anti-stiction material (e.g., a lubricant applied as a monolayer coating) may be used to coat the exposed surfaces of these sidewalls to prevent any frictional forces from impeding the physical joining second plate 24 with first plate 18.

By virtue of using, in one embodiment, precision lithographic techniques to form the tapered sidewalls and openings in silicon-based connector assembly plates, the input and output optical signal paths will pass through transparent lid 16 and openings 20 and 30 in a predetermined manner.

Figure 7:
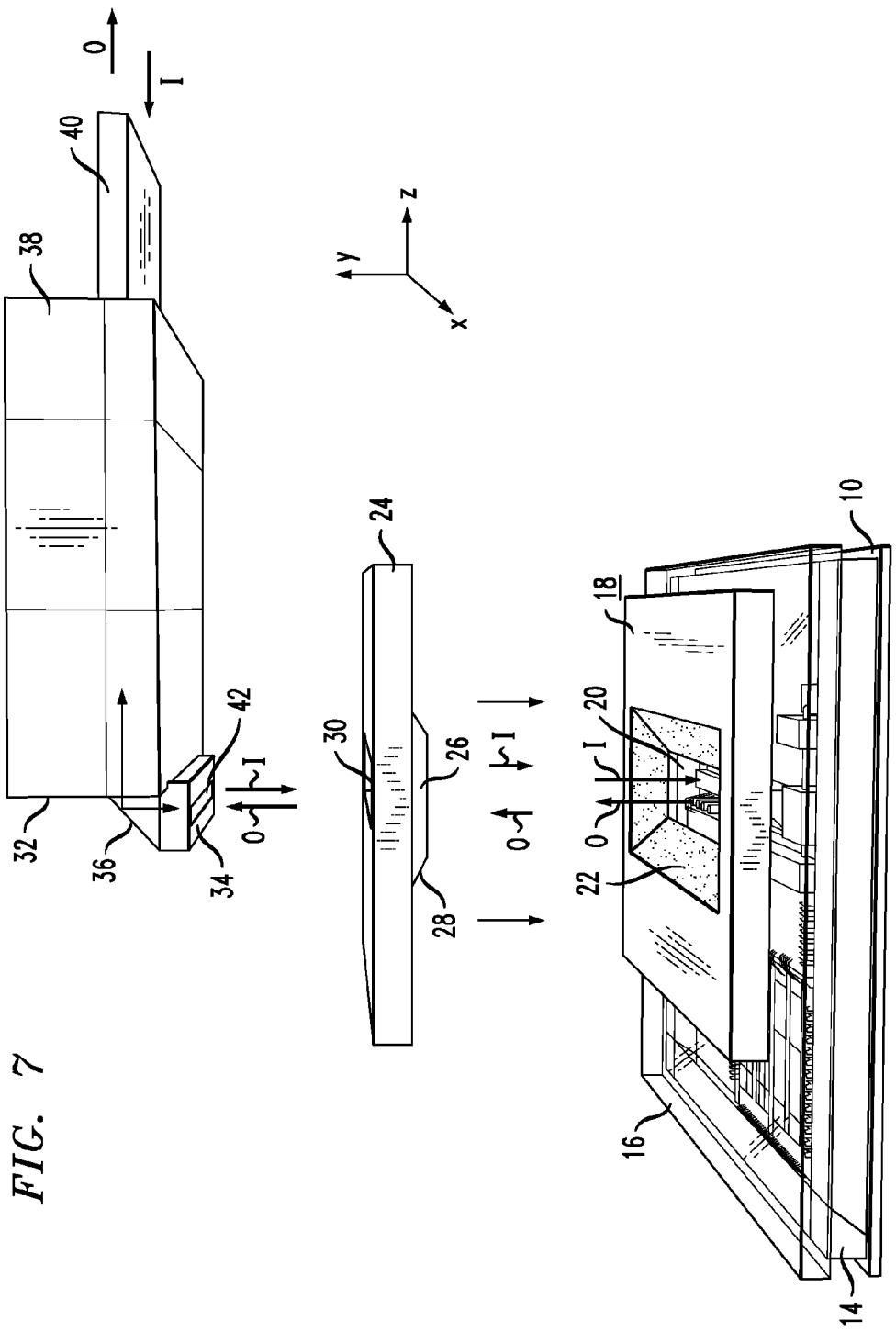
FIG. 7 illustrates, in an exploded view, an exemplary fiber array connector as associated with an exemplary two-piece self-aligned connectorized fiber array assembly.

FIG. 7 illustrates, in an exploded view, an exemplary fiber array connector as associated with an exemplary two-piece self-aligned connectorized fiber array assembly. As shown, a fiber array connector 32 includes a lens array 34, a turning surface 36 and a fiber array assembly 38 (including a plurality of optical fibers 40). In use, lens array 34 engages opening 30 of second connector assembly plate 24 in a manner such that a plurality of individual lens elements 42 of lens array 34 aligns with the individual input and output optical signal paths of the assembly (the individual signal paths best shown in FIG. 2). Precision manufacturing techniques can be used to ensure that lens array 34 mates with opening 30 in a manner that provides optical alignment between lens elements 42 and the defined optical port region R. Turning surface 36 is used in this particular embodiment to re-direct the signals between the propagation axis of optical fibers 40 (shown as the z-axis in this example) and the propagation axis of interposer 10 (shown as the y-axis in this example).

While the invention has been described in terms of different embodiments, those skilled in the art will recognize that the invention can be practiced with various modifications that are considered to fall within the spirit and scope of the invention as best defined by the claims appended hereto. Furthermore, while the specification has been described in language specific to structural features and/or methodological acts, the claims are not limited to the features or acts described above. Rather, the specific features and acts described above are disclosed as examples for embodiments of the invention.

What is claimed is:

1. An apparatus comprising
an interposer substrate for supporting a plurality of opto-electronic components used for creating optical output signals and receiving optical input signals;
an enclosure covering the interposer substrate, the enclosure including a transparent lid through which the optical output and input signals pass through in a defined optical port region;
a self-aligned connectorized fiber array assembly comprising
a first connector assembly plate including a central opening and disposed on the transparent lid such that the central opening aligns with the defined optical port region of the transparent lid, the first connector assembly plate formed to include inwardly-tapering sidewalls surrounding the periphery of the central opening, and
a second connector assembly plate formed to include a central opening having a lower protrusion with inwardly-tapering sidewalls that mate with the inwardly-tapering sidewalls of the first connector assembly plate to form the self-aligned connectorized fiber array assembly; and
a fiber connector coupled to the central opening of the second connector assembly plate, the fiber connector for supporting one or more optical fibers in alignment with the self-aligned connectorized fiber array assembly and the optical output and input signals associated with the opto-electronic components.

2. The apparatus as defined in claim 1 wherein the transparent lid comprises a glass material.

3. The apparatus as defined in claim 1 wherein the first and the second connector assembly plates are silicon-based components.

4. The apparatus as defined in claim 3 wherein the first and the second connector assembly plates are etched to form the central openings and inwardly-tapering sidewalls.

5. The apparatus as defined in claim 4 wherein KOH is used to etch the inwardly-tapering sidewalls of the first and the second connector assembly plates.

6. The apparatus as defined in claim 1 wherein visual fiducial markings are used to provide alignment between the transparent lid and the first connector assembly plate.

7. The apparatus as defined in claim 1 wherein mechanical fiducial markings are used to provide alignment between the transparent lid and the first connector assembly plate.

8. The apparatus as defined in claim 1 wherein the inwardly-tapering sidewalls of the first connector assembly plate are coated with an anti-stiction material.

9. The apparatus as defined in claim 1 wherein the second connector assembly plate is permanently attached to the first connector assembly plate.

10. The apparatus as defined in claim 1 wherein the second connector assembly plate is removably attached to the first connector assembly plate.

11. A method, comprising:
   providing an interposer substrate including a plurality of opto-electronic components for creating optical output signals and receiving optical input signals;
   placing an enclosure over the interposer substrate, the enclosure including a transparent lid through which the optical output and input signals pass through in a defined optical port region of the transparent lid;
   aligning a first connector assembly plate with the defined optical port region of the transparent lid, the first connector assembly plate including a central opening for allowing passage of the optical input signals and the optical output signals, and the first connector assembly plate includes a plurality of inwardly-tapering sidewalls surrounding the central opening;
   attaching the first connector assembly plate to the transparent lid in an aligned configuration;
   mating a second connector assembly plate with the first connector assembly plate, the second connector assembly plate having a central opening and a lower protrusion surrounding the central opening, the lower protrusion having a plurality of inwardly-tapering sidewalls that mate with the inwardly-tapering sidewalls of the first connector assembly plate in a self-aligned configuration; and
   attaching a fiber assembly to the central opening of the second connector assembly plate, the fiber assembly configured to support one or more optical fibers in alignment with the optical input signals and the optical output signals passing through the defined port region.

12. The method of claim 11 wherein the aligning of the first connector assembly plate with the defined optical port region of the transparent lid is performed by using a visual alignment system.

13. The method of claim 12 wherein the visual alignment system utilizes a fiducial marker formed on the transparent lid and a known edge location of the first connector assembly plate to achieve alignment by visually overlapping the fiducial marker with the known edge location.

14. The method of claim 12 wherein the visual alignment system utilizes a known edge location of an element disposed on the interposer substrate and a known edge location of the first connector assembly plate to achieve alignment by visually overlapping the known edge location of the element on the interposer substrate with the known edge location on the first connector assembly plate.

15. The method of claim 11 wherein the alignment is achieved by using a mechanical alignment system.

16. The method of claim 11 wherein the first and the second connector assembly plates are formed of silicon and an etching process is used to form the inwardly-tapering sidewalls and the central openings.

17. The method of claim 11 wherein the method further comprises permanently bonding the second connector assembly plate to the first connector assembly plate prior to attaching the fiber assembly.

18. The method of claim 11 wherein the second connector assembly plate mates with the first connector assembly plate in a removable attachment configuration.

19. An apparatus for providing attachment between an opto-electronic subassembly and a fiber array connector, the apparatus comprising a self-aligned connectorized fiber array assembly including
   a first connector assembly plate including a central opening and inwardly-tapering sidewalls surrounding the periphery of the central opening, and
   a second connector assembly plate formed to include a central opening having a lower protrusion with inwardly-tapering sidewalls that mate with the inwardly-tapering sidewalls of the first connector assembly plate to form the self-aligned connectorized fiber array assembly.

20. The apparatus of claim 19 wherein the first and the second connector assembly plates comprise silicon, with the central openings and inwardly-tapering sidewalls comprising etched regions formed using a photolithographic process.

* * * * *